United States Patent
Watanabe

(10) Patent No.: US 8,237,545 B2
(45) Date of Patent: Aug. 7, 2012

(54) WIRELESS TRANSPONDER AND IMAGE FORMING DEVICE

(75) Inventor: Masao Watanabe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1126 days.

(21) Appl. No.: 11/662,577

(22) PCT Filed: Jan. 19, 2005

(86) PCT No.: PCT/JP2005/000581
§ 371 (c)(1),
(2), (4) Date: Mar. 12, 2007

(87) PCT Pub. No.: WO2006/038312
PCT Pub. Date: Apr. 13, 2006

(65) Prior Publication Data
US 2007/0268112 A1    Nov. 22, 2007

(30) Foreign Application Priority Data
Sep. 30, 2004   (JP) ................ 2004-288721

(51) Int. Cl.
*H04Q 5/22*   (2006.01)

(52) U.S. Cl. ............... 340/10.1; 340/572.1; 340/539.22; 367/189; 367/157

(58) Field of Classification Search ........ 340/10.1, 340/825.72, 825.54, 572.1–572.7, 539.1, 340/539.22; 342/42, 44, 50, 51; 271/8.1, 271/265.04; 367/157, 171–176, 189
See application file for complete search history.

(56) References Cited

U.S. PATENT DOCUMENTS

| | | | |
|---|---|---|---|
| 3,273,146 A | 9/1966 | Hurwitz | |
| 4,399,441 A | 8/1983 | Vaughan et al. | |
| 5,351,219 A * | 9/1994 | Adachi et al. | 367/140 |
| 6,015,387 A | 1/2000 | Schwartz et al. | |
| 6,144,332 A * | 11/2000 | Reindl et al. | 342/42 |
| 6,617,963 B1 | 9/2003 | Watters et al. | |
| 6,806,808 B1 | 10/2004 | Watters et al. | |
| 7,034,660 B2 | 4/2006 | Watters et al. | |
| 2002/0154029 A1 | 10/2002 | Watters et al. | |
| 2004/0074974 A1 * | 4/2004 | Senba et al. | 235/492 |
| 2004/0118197 A1 * | 6/2004 | Bulst et al. | 73/146 |

FOREIGN PATENT DOCUMENTS

| | | |
|---|---|---|
| JP | A 55-46159 | 3/1980 |
| JP | A 56-149696 | 11/1981 |
| JP | A 57-208419 | 12/1982 |
| JP | A-61-104280 | 5/1986 |
| JP | A 3-296629 | 12/1991 |
| JP | A 8-505466 | 6/1996 |
| JP | A-8-285708 | 11/1996 |
| JP | B2 3315984 | 8/2002 |
| JP | A-2002-538519 | 11/2002 |
| JP | 2004004181 A * | 1/2004 |
| JP | A 2004-4181 | 1/2004 |
| WO | WO 03/104759 A1 | 12/2003 |

* cited by examiner

*Primary Examiner* — Daniel Wu
*Assistant Examiner* — Nay Tun
(74) *Attorney, Agent, or Firm* — Oliff & Berridge, PLC

(57) ABSTRACT

The present invention provides a wireless transponder comprising: a receiver unit that receives an electromagnetic input signal; an input converter unit that converts into an acoustic wave the electromagnetic input signal received by the receiver unit; a delay unit provided in a direction in which an acoustic wave generated by the input converter unit propagates; an output converter unit that converts into an electromagnetic output signal the acoustic wave which has propagated inside the delay unit; and a transmitter unit that transmits wirelessly the electromagnetic output signal generated by the output converter unit.

12 Claims, 10 Drawing Sheets

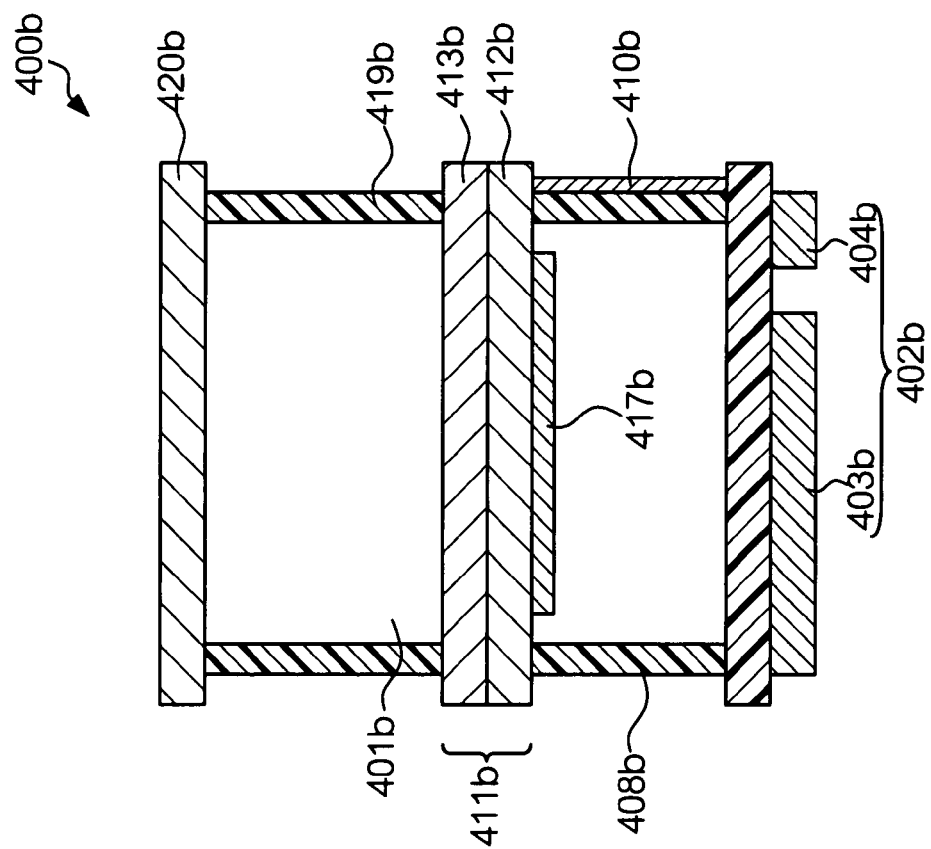
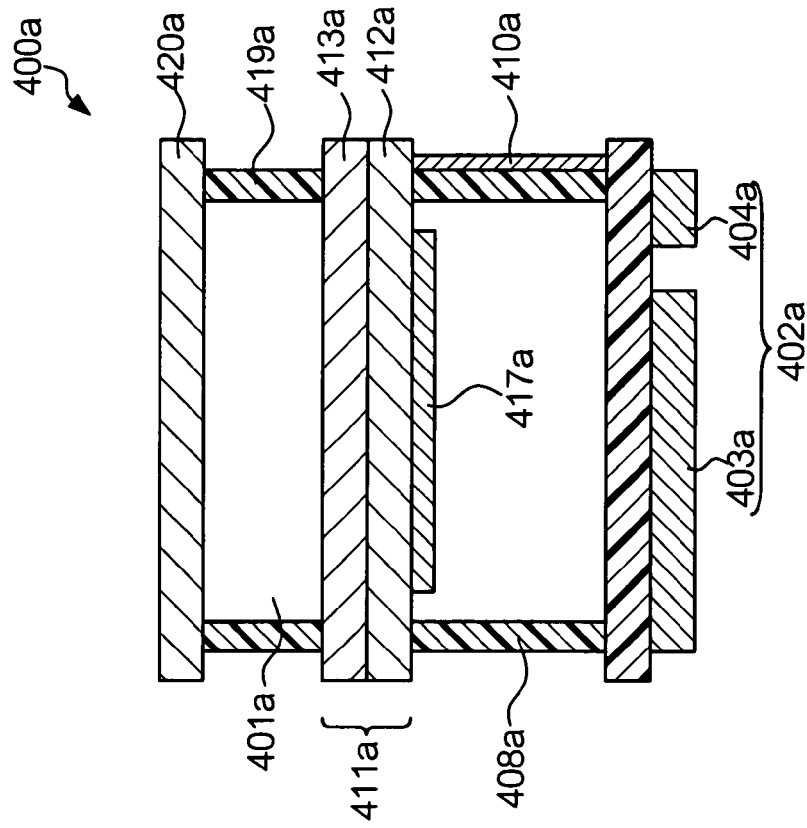
FIG. 12B
FIG. 12A

WIRELESS TRANSPONDER AND IMAGE FORMING DEVICE

BACKGROUND

1. Technical Field

The present invention relates to a wireless transponder and a wireless response method for transmitting/receiving a signal to/from an interrogator, and particularly to a wireless transponder capable of communication in a high-noise environment without a specific energy source, and an image forming device using the wireless transponder as a path sensor for a recording material.

2. Related Art

Various sensors have been developed with a view to measuring physical and chemical characteristics, and the like. In most such sensors, output signals vary depending on physical and chemical characteristics of the targets to be measured, and also the environment. Information such as physical and chemical characteristics concerning targets to be measured and the like is obtained by processing signals that are output as a result of measurement. The sensors are provided separately from a device (hereinafter an "interrogator") for processing output signals from the sensors. Usually, the sensors and the interrogator are used at different respective locations. In such a case, it is necessary to provide signal cables from the sensors to communicate with the interrogator.

However, the structure of signal cables that are used for such a purpose gives rise to a problem, in that it becomes difficult to provide a signal cable to an object in motion such as a moving or rotating object, inside a very small space such as a blood vessel, or in a chemically or biologically harsh environment.

To address the problem stated above, signals may be wirelessly transmitted/received to/from an interrogator. A sensor used for this purpose is a wireless transponder called a surface acoustic wave sensor (SAW sensor) which uses a surface acoustic wave element (see Patent Documents 1-3). The surface acoustic wave sensor is a device which requires no specific energy source. The surface acoustic wave sensor may sense information concerning a target to be measured and an environment, and may send as a response an identification signal of a device.

| Patent Document 1: | U.S. Pat. No. 3273146 |
|---|---|
| Patent Document 2: | JP-A-55-46159 |
| Patent Document 3: | JP-B-3315984 |

However, wireless transponders described in Patent Documents 1-3 have a structure which includes a surface acoustic wave element which requires use of a high-frequency wave of several MHz or higher to transmit/receive a signal. Consequently, in a case that the wireless transponders used are surrounded by metal, the electromagnetic waves are not able to satisfactorily travel within a range of several cm (centimeters) or so due to the short length of the electromagnetic waves. Examples of such objects are electronic devices having a component in which a large number of conductive wiring patterns are formed, various manufacturing devices constituted of metal carriers, or vehicles and airplanes having metal frames. That is, there exists a problem that the wireless transponders do not function satisfactorily.

In another case of using an electromagnetic wave having a low frequency of several 100 kHz, a wavelength of the electromagnetic wave is as long as several km (kilometers) or more; but in this case, a problem arises in that their use makes it difficult to form a small antenna of a radiative emission type. An inductive emission antenna of a wound coil type may be employed with a view to downsizing an antenna to be used. However, when used in an environment that is surrounded by metal, smooth propagation of signals is hindered by absorption of magnetic fields, as mentioned above.

SUMMARY

The present invention has been made in view of the situation as described above and is directed to providing a small wireless transponder capable of excellent wireless communication in an environment surrounded by metal.

According to one aspect of the invention, which invention has been made to address the object as described above, there is provided a wireless transponder including: a receiver unit that receives an electromagnetic input signal; an input converter unit that converts into an acoustic wave the electromagnetic input signal received by the receiver unit; a delay unit provided in a direction in which an acoustic wave generated by the input converter unit propagates; an output converter unit that converts into an electromagnetic output signal the acoustic wave which has propagated inside the delay unit; and a transmitter unit that transmits wirelessly the electromagnetic output signal generated by the output converter unit.

According to an alternative configuration, at least one of the receiver unit and the transmitter unit may have an antenna having a coil that is wound a plurality of turns around a ferrite magnet so as to comply with a matching condition within a predetermined frequency range.

According to another alternative configuration, at least one of the input converter unit and the output converter unit may have a piezoelectric element.

According to still another alternative configuration, the delay unit may be a medium characterized in that at least one of phase, frequency, and amplitude of the acoustic wave propagating inside the delay unit changes depending on a physical or chemical characteristics of an external environment.

According to still another alternative configuration, the wireless transponder may further include a reflector unit that reflects the acoustic wave propagating through the delay unit, wherein the input converter unit functions also as the output converter unit.

According to still another alternative configuration, the delay unit may include delay units of a plurality of types, and each of the delay units of the plurality of types is a medium characterized in that at least one of phase, frequency, and amplitude of the acoustic wave propagating inside the delay unit changes depending on a physical or chemical characteristics of an external environment.

According to still another alternative configuration, the receiver unit and the transmitter unit may be matched with an electromagnetic wave of a frequency lower than about 150 kHz.

According to still another alternative configuration, the wireless transponder may further include an opening in the delay unit. According to yet another aspect of the invention, there is provided an image forming device including: the wireless transponder according this alternative configuration; a recording material conveyor path that extends through the opening; and a detector unit that detects that a recording material has passed beyond a position corresponding to an inside of the opening, on the recording material conveyor path, based on a response signal from the wireless transponder.

According to still another aspect of the invention, there is provided a wireless transponder including: an input unit including a receiver unit that receives an electromagnetic input signal, and an input converter unit that converts into an acoustic wave an electromagnetic input signal received by the receiver unit; and an output unit provided at a predetermined distance from the input unit, the output unit including an output converter unit that converts into an electromagnetic output signal the acoustic wave which has been propagated from the input unit, and a transmitter unit that transmits wirelessly the electromagnetic output signal generated by the output converter unit.

According to still another aspect of the invention, there is provided a wireless transponder group including: a first wireless transponder including a first receiver unit that receives an electromagnetic input signal, a first input converter unit that converts into a first acoustic wave the electromagnetic input signal received by the first receiver unit, a first delay unit provided in a direction in which the first acoustic wave generated by the first input converter unit propagates, a first output converter unit that converts into an electromagnetic output signal the first acoustic wave which has propagated inside the first delay unit, and a first transmitter unit that transmits wirelessly the electromagnetic output signal generated by the first output converter unit; and a second wireless transponder including a second receiver unit that receives an electromagnetic input signal, a second input converter unit that converts into a second acoustic wave the electromagnetic input signal received by the second receiver unit, a second delay unit provided in a direction in which the second acoustic wave generated by the second input converter unit propagates, a second output converter unit that converts into an electromagnetic output signal the second acoustic wave which has propagated inside the second delay unit, and a second transmitter unit that transmits wirelessly the electromagnetic output signal generated by the second output converter unit.

The wireless transponder according to any of the above aspects of the invention allows signals to propagate as acoustic waves inside the delay unit, to thereby enable use of a low-frequency signal. Accordingly, wireless signals may be extracted satisfactorily even in environment that is surrounded by metal. Further, the wireless transponder has a simple structure which enables downsizing and cost reduction. Further, highly accurate sensing may be achieved in an environment surrounded by metal, and also in remote locations by using a function of sensing a physical or chemical characteristics as a delay unit.

BRIEF DESCRIPTION OF THE DRAWINGS

Exemplary embodiments of the present invention will be described in detail based on the following figures, wherein:

FIGS. 12A and 12B are sectional views showing device structures of wireless transponders 400 according to a fourth embodiment of the invention;

DESCRIPTION OF REFERENCE NUMERALS

1 . . . wireless response system, 10 . . . wireless transponder, 11 . . . receiver unit, 12 . . . input converter unit, 13 . . . delay medium, 14 . . . output converter unit, 15 . . . transmitter unit, 20 . . . interrogator, 21 . . . transceiver unit, 22 . . . signal processing unit, 23 . . . display, 24 . . . interface, 25 . . . controller, 100 . . . wireless transponder, 101 . . . delay media, 102 . . . receiver unit, 103 . . . coil antenna, 104 . . . matching circuit, 105 . . . transmitter unit, 106 . . . coil antenna, 107 . . . matching circuit, 108 . . . carrier, 109 . . . carrier, 110 . . . wiring, 111 . . . input converter unit, 112 . . . piezoelectric element, 113 . . . substrate, 114 . . . output converter, 115 . . . piezoelectric element, 116 . . . substrate, 117 . . . electrode, 118 . . . electrode, 119 . . . spacer, 200 . . . wireless transponder, 201 . . . delay media, 204 . . . matching circuit, 207 . . . matching circuit, 300 . . . wireless transponder, 301 . . . delay media, 311 . . . input converter unit, 312 . . . piezoelectric element, 313 . . . substrate, 314 . . . output converter, 315 . . . piezoelectric element, 317 . . . electrode, 318 . . . electrode, 319 . . . spacer, 400 . . . wireless transponder, 401 . . . delay media, 402 . . . receiver unit, 403 . . . coil antenna, 404 . . . matching circuit, 408 . . . carrier, 411 . . . input converter unit, 412 . . . piezoelectric element, 413 . . . substrate, 416 . . . substrate, 419 . . . spacer, 420 . . . reflector, 500 . . . wireless transponder, 530 . . . input unit, 540 . . . output unit, 550 . . . multi-function peripheral device, 551 . . . manual feed tray, 552 . . . cut sheet tray, 553 . . . sheet output tray, 554 . . . sheet conveyor path, 555 . . . conveyor rollers, 703 . . . coil antenna, 706 . . . coil antenna, 708 . . . carrier, 709 . . . carrier, 713 . . . substrate, 716 . . . substrate, 717 . . . electrode, 718 . . . electrode, 719 . . . spacer, 721 . . . antenna unit, 722 . . . antenna unit, 723 . . . impedance matching unit, 724 . . . impedance matching unit, 900 . . . wireless transponder, 901 . . . transceiver antenna unit, 902 . . . matching circuit, 903 . . . RF converter unit, 904 . . . temperature sensor

DETAILED DESCRIPTION

1. Basic Structure

Figure 1:
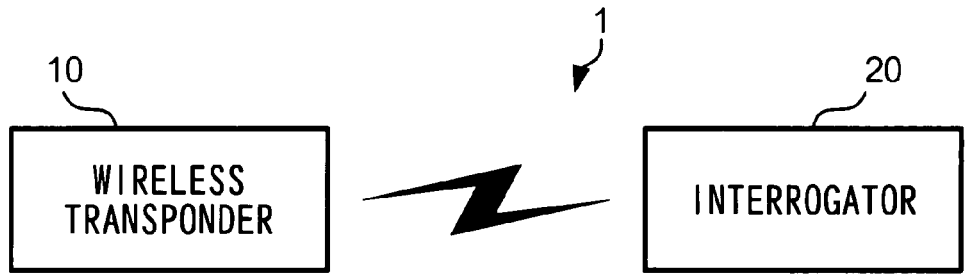
FIG. 1 is a block diagram showing a system configuration of an exemplary embodiment of the invention.

FIG. 1 is a block diagram showing a system configuration of a wireless response system 1 according to an exemplary embodiment of the present invention. The wireless response system 1 includes a wireless transponder 10 and an interrogator 20. The interrogator 20 sends an interrogation signal to the wireless transponder 10, receives a response signal from the wireless transponder 10, and performs signal processing on the response signal.

Figure 2:
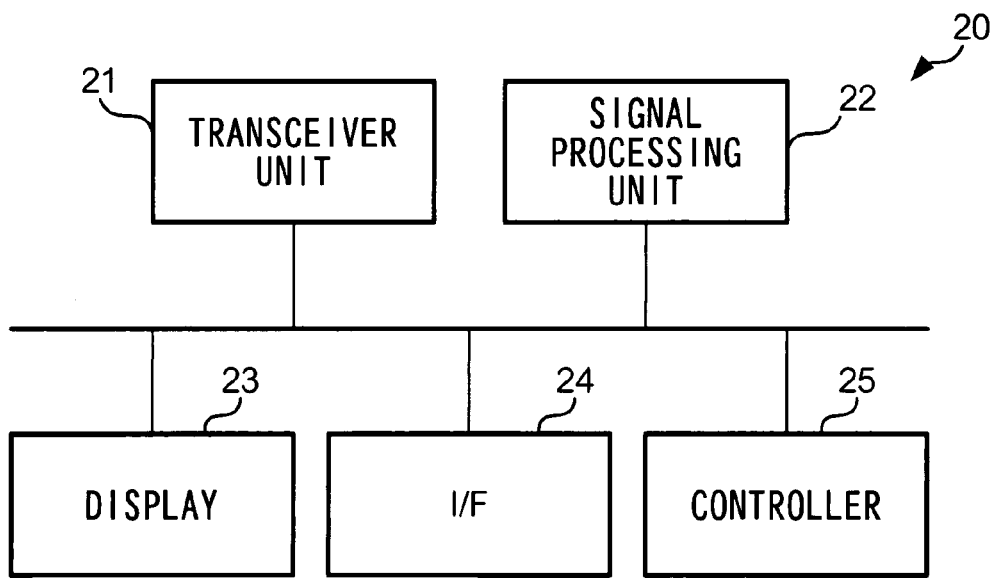
FIG. 2 is a block diagram showing a structure of an interrogator 20.

FIG. 2 is a block diagram showing a structure of the interrogator 20 according to the embodiment. As shown in FIG. 2, the interrogator 20 is a computer device including: a transceiver unit 21 that transmits/receives signals to/from the wireless transponder 10; a signal processing unit 22 that performs signal processing on a received signal; a display 23 that displays results of signal processing and the like; an I/F (interface) that transmits/receives data and control signals to/from external devices; and a controller 25 that controls these components.

Figure 3:
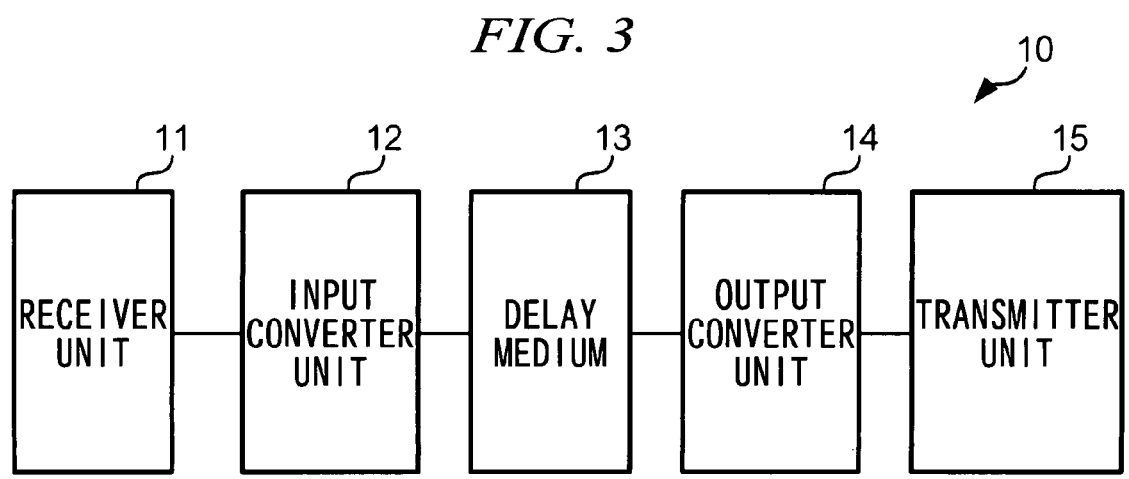
FIG. 3 is a block diagram showing a functional structure of a wireless transponder 10.

FIG. 3 is a block diagram showing a functional structure of the wireless transponder 10 according to the embodiment. The wireless transponder 10 includes: a receiver unit 11 that wirelessly receives an electromagnetic interrogation signal (input signal); an input converter unit 12 that converts the input signal into an acoustic wave; a delay medium 13 that propagates the converted signal; an output converter unit 14 that converts the signal from the delay medium 13 into an electric signal; and a transmitter unit 15 that transmits the electric signal wirelessly as an electromagnetic interrogation signal (output signal).

The receiver unit 11 and transmitter unit 15 each include an antenna and a matching circuit. Available as the antenna is a small antenna in which a coil is wound plural turns around a ferrite magnet so as to comply with matching conditions within a desired frequency range. Single or plural matching capacitors (condensers) may be used for the matching circuit.

The input converter unit 12 and output converter unit 14 have a piezoelectric element that converts into an acoustic wave a low-frequency electronic signal of about 10 to several 100 Hz or so introduced from the antenna. The piezoelectric element has a specific resonance frequency and is caused to generate an acoustic wave by an alternating current equivalent to the resonance frequency. As the piezoelectric element, a round columnar piezoelectric element may be used with a patterned electrode provided on each or one of two surfaces of the element.

The delay medium 13 allows acoustic waves to propagate. Acoustic waves propagate inside the delay medium 13 with a delay time. Solid material such as glass, metal, or ceramics, gel material, liquid, or gas may be used as the delay medium 13. If material which causes propagation condition of acoustic waves to change under influence of external environment such as temperature, humidity, or pressure is used for the delay medium 13, a frequency, phase, or amplitude of a signal propagating inside the delay medium 13 changes. The signal which has thus propagated through the delay medium 13 is extracted as an output signal and is subjected to signal processing. In this manner, changes in an external environment may be sensed. That is, the delay medium 13 may have a sensor function. Otherwise, the delay medium 13 may have a function of generating an identification signal to distinguish plural wireless transponders from each other by forming a reflector or absorbent in the delay medium or by using wireless transponders having delay media with respectively different thicknesses (i.e., channel lengths for acoustic propagation). If wireless transponders are used as identification signs, it is desirable to use a material which does not function as a sensor for changing a signal under influence from outside.

Figure 4A:
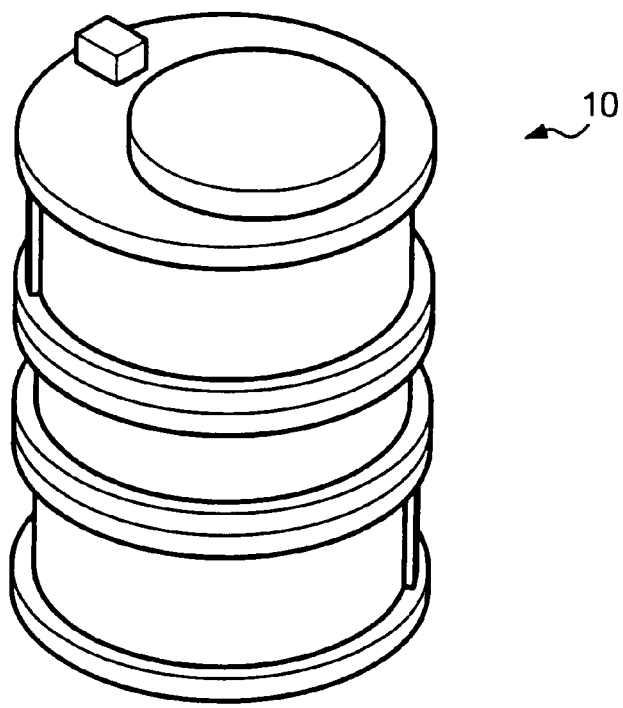
FIG. 4A is a sectional view showing a device structure of the wireless transponder 10 and FIG. 4B is a sectional view showing a device structure of the wireless transponder 10.
Figure 4B:
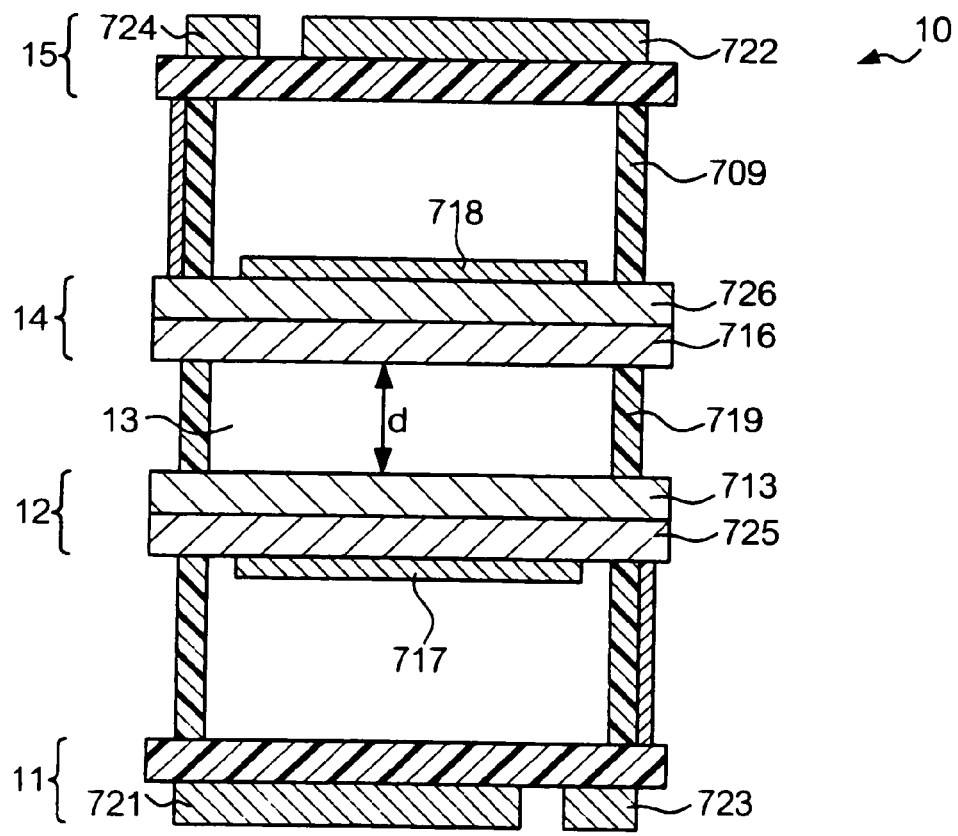

FIG. 4A is a sectional view showing a device structure of a wireless transponder 10 according to the embodiment of the invention. FIG. 4B is a perspective view showing a structure of the wireless transponder 10. Hereinafter, a basic structure of the wireless transponder 10 will be described based on FIGS. 4A and 4B.

As shown in FIG. 4A, the wireless transponder 10 has a sandwiched structure in which the delay medium 13 is sandwiched between the input converter unit 12 and output converter unit 14. A carrier 708 is coupled to an opposite face of the input converter unit 12 to a face of the unit 12 which is in contact with the delay medium 13. The receiver unit 11 is formed on the carrier 708. In a similar manner, a carrier 709 is coupled to an opposite face of the output converter unit 14 to a face of the unit 14 which is in contact with the delay medium 13. On the carrier 709, the transmitter unit 15 is formed. A spacer 719 is provided between the input converter unit 12 and the output converter unit 14. As shown in FIG. 4B, the spacer 719 is a member having a round cylindrical shape. Therefore, the delay medium 13 is filled in a closed space defined by the input converter unit 12, output converter unit 14, and spacer 719. Although the delay medium 13 is desirably filled in the closed space in order to prevent dispersion of the delay medium 13, an opening may be formed at a part of the spacer 719. FIG. 4B illustrates the carriers 708 and 709 each as a round cylindrical member as well. These carriers need not be closed inside but may have any type of structure as far as the structure is capable of supporting the receiver unit 11 and transmitter unit 15.

The wireless transponder 10 shown in FIGS. 4A and 4B uses air as the delay medium 13. However, other material may be used for the delay medium 13. That is, any other material such as solid material like glass, metal, or ceramics, gel material, liquid, gas, or the like may be used as far as the material allows acoustic propagation. An appropriate material is selected for the delay medium 13 depending on required frequency, sensitivity, etc. Several of foregoing materials may be combined for use.

Materials that may be used for piezoelectric materials 725 and 726 in the electromagnetic/acoustic wave converter of the input converter unit 12 and output converter unit 14 are: (1) oxides for example, $SiO_2$, $SrTiO_3$, $BaTiO_3$, $BaZrO_3$, $LaAlO_3$, $ZrO_2$, $Y_2O38\%$-$ZrO_2$, MgO, $MgAl_2O_4$, $LiNbO_3$, $LiTaO_3$, $Al_2O_3$, and ZnO; (2) $ABO_3$ perovskite materials for example, $BaTiO_3$, $PbTiO_3$, and $Pb_{1-x}La_x(Zr_yTi_{1-y})_{1-x/4}O_3$ (which produces so-called PZT, PLT, and PLZT depending on characteristics of x and y); (3) tetragonal, orthorhombic, or pseudo cubic materials for example, $KnbO_3$; (4) ferroelectric materials having a pseudo ilmenite structure typical examples of which are $LiNbO_3$ and $LiTaO_3$; (5) tungsten bronze materials for example, $Sr_xba_{1-x}Nb_2O_6$, $Pb_xBa_{1-x}Nb_2O_6$; (6) relaxer ferroelectric materials for example, $Bi_4Ti_3O_{12}$, $Pb_2KNb_5O_{15}$, $K_3Li_2Nb_5O_{15}$, $Pb(Zn_{1/3}Nb_{2/3})O_3$, $Pb(Mg_{1/3}Nb_{2/3})O_3$, $Pb(Ni_{1/3}Nb_{2/3})O_3$, $Pb(In_{1/3}Nb_{2/3})O_3$, $Pb(Sc_{1/3}Nb_{2/3})O_3$, $Pb(Sc_{1/3}Na_{2/3})O_3$, and $Pb(Cd_{1/3}Nb_{2/3})O_3$; (7) high-polymer materials for example, polyvinylidene fluoride (PVDF); and (8) composite materials selected from ferroelectric substituted derivatives cited above.

Among the materials described above, PZT, PVDF, or a composite material of these two materials is desirable for the wireless transponder 10 according to the embodiment, in view of a coupling coefficient, a piezoelectric coefficient, etc.

The piezoelectric materials 725 and 726 are molded into a plate-type shape or round columnar shape having a thickness defined under resonance conditions. An electrode (717 or 718) is provided on at least one face of each of the piezoelectric materials 725 and 726. The piezoelectric materials 725 and 726 are held by substrates 713 and 716. The piezoelectric materials 725 and 726 are applied with an electric signal that satisfies the resonance conditions from the electrodes. The piezoelectric materials 725 and 726 are thereby caused to generate a vertical vibration, horizontal vibration, or thickness-extensional vibration. As a result of this, an electric signal is converted into an acoustic wave. Vibration modes of the vertical, horizontal, and thickness-extensional vibrations may be controlled by patterns or layouts of the electrodes formed on the piezoelectric materials 725 and 726. The input converter unit 12 and output converter unit 14 may be formed by only one piezoelectric material without using the substrates 713 and 716. However, use of bonding to provide a structure of substrates and piezoelectric materials is more desirable due to the advantage that signal lines and GND (ground) may be wired separately, and also the advantage that distortion of piezoelectric materials is enhanced by inputting signals having different polarities to two piezoelectric materials To propagate a generated acoustic wave, the delay medium 13 is located adjacent to the input converter unit 12 and output converter unit 14. As described above, any of solid material such as glass, metal, or ceramics, gel material, liquid, and gas may be used as material for the piezoelectric materials. Material used for the delay medium 13 is properly selected in accordance with purposes of the wireless transponder, such as, loss of acoustic propagation from piezoelectric materials, acoustic propagation speed, demands for sensing performance, etc. The thickness (a length in a propagation direction of acoustic waves) of the delay medium affects delay time of an output signal and may be properly selected in accordance with purposes of the wireless transponder. A delay medium having a thickness between about 100 μm (micrometers) to about 1 m is used normally.

Although the wireless transponder shown in FIGS. 4A and 4B has a pair of antenna units (antenna units 721 and 722) respectively for input and output sides, the device may be configured to have plural pairs of antennas. Alternatively, one antenna may serve both as a receiver antenna and a transmitter antenna. In this case, a symmetrical structure may be established between input and output sides. Therefore, the input converter unit and the receiver antenna may be caused to function also as an output converter unit and a transmitter antenna by forming a reflector in the wireless transponder.

The antenna units 721 and 722 each have a coil antenna and a capacitor. The coil antenna is formed by winding a coil around a ferrite magnet so as to comply with matching conditions within a desired frequency range. In the wireless transponder shown in FIGS. 4A and 4B, the antenna units are coupled to piezoelectric materials. The structure may be arranged so that the antenna units are formed on the same substrates (substrates 713 and 716) as the electromagnetic/acoustic converter.

Impedance matching units 723 and 724 each are a matching circuit formed in a manner in which one or two or more of a capacitor, resistor, and inductor are connected in parallel or series with an antenna unit. The impedance matching units 723 and 724 each function to tune an antenna unit to a desired frequency and to achieve electric matching with piezoelectric materials.

FIGS. 4A and 4B show a structure in which the antenna units 721 and 722 and the impedance matching units 723 and 724 are provided respectively on the carriers 708 and 709. The structure may be arranged so that the antenna units 721 and 722 and the impedance matching units 723 and 724 are directly formed on surfaces of piezoelectric elements. However, if a complex member is formed on a surface of a piezoelectric element, vibration of the piezoelectric element (conversion of an electromagnetic wave into an acoustic wave) is hindered. Therefore, the antenna units and impedance matching units are desirably provided on members other than piezoelectric elements.

Next, an example of operation of the wireless transponder according to the embodiment will be described.

Figure 5:
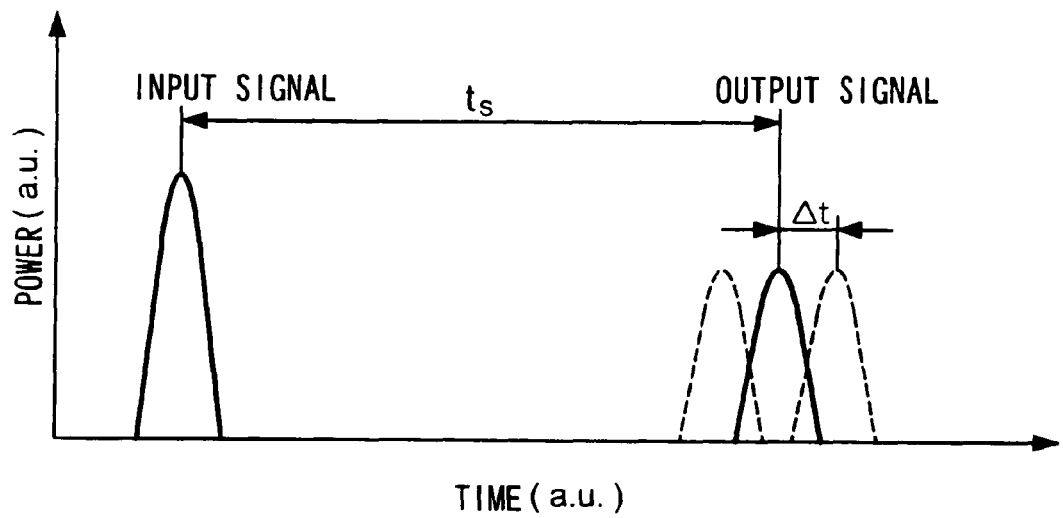
FIG. 5 shows an example of input and output signals according to the exemplary embodiment.

FIG. 5 is a graph showing an example of input and output signals according to the embodiment. The receiver antenna receives wirelessly an electromagnetic interrogation signal of a low frequency (FIG. 5: input signal). The interrogation signal is then converted into an acoustic wave of a low frequency by a piezoelectric material connected to the antenna. The acoustic wave propagates through the delay medium 13 to a piezoelectric material in the output side. At this time, the phase of the acoustic wave propagating through the delay medium shifts from the phase of the interrogation signal due to a propagation delay at the delay medium 13. The delayed signal is outputted as an output signal. At a certain standard temperature, a shift amount (FIG. 5: $t_S$) by which an acoustic wave propagating through a delay medium shifts from an input signal is a constant value determined by a material and a thickness of the delay medium. If the delay medium has a temperature higher or lower than the standard temperature, the phase of the acoustic wave further shifts in a positive or negative direction from $t_S$ (FIG. 5: $\Delta t$). The acoustic wave which has propagated to the piezoelectric material in the transmitter side is converted into an electromagnetic signal, i.e., a response signal. The response signal is transmitted to the interrogator from the antenna connected to the piezoelectric material. Upon receiving the response signal, the interrogator obtains a shift amount from the interrogation signal by signal processing. Based on the shift amount, the temperature of the delay medium 13, i.e., the temperature of a target to be measured is obtained.

Figure 6:
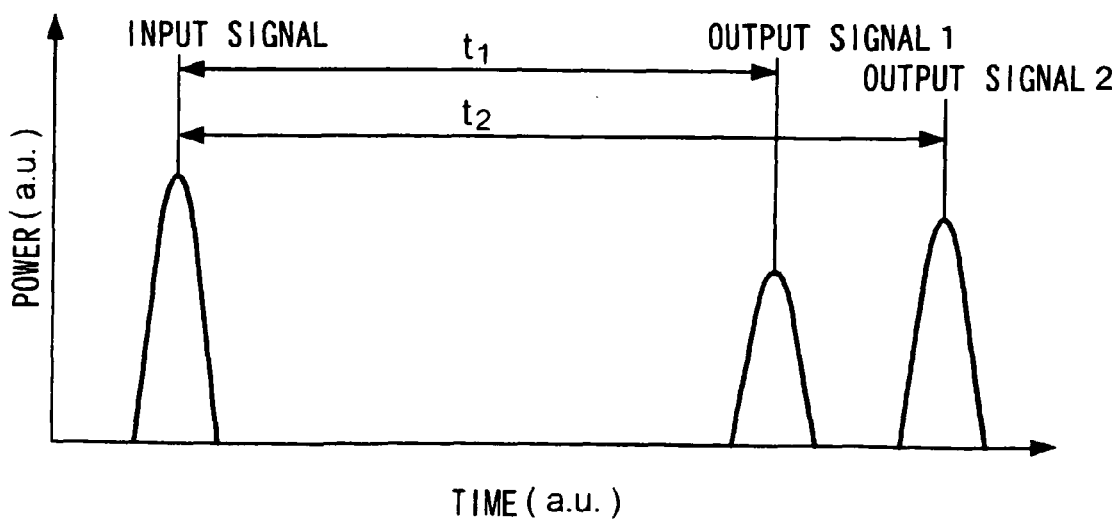
FIG. 6 shows an example of input and output signals according to the exemplary embodiment.

If two wireless transponders are used respectively with delay media having respectively different thicknesses, shift amounts in phase of output signals from the transponders depend on the thicknesses of the delay media. Therefore, the wireless transponders may be identified respectively by phases of the output signals (response signals). FIG. 6 is a graph showing an example of input and output signals according to the embodiment. Specifically, shift amounts of phases of two wireless transponders differ depending on the thicknesses of a delay media (FIG. 6: $t_1$ and $t_2$). In this manner, response signals may be used as identification signals for wireless transponders.

The wireless transponder according to this exemplary embodiment may simultaneously implement two functions, i.e., the sensor function and the identification function as described above, if material and thickness of the delay medium is designed appropriately. For example, wireless transponders may be designed so that a shift amount in phase of a wireless transponder does not overlap a shift amount of another wireless transponder, within a temperature range to be measured. Then, physical characteristics such as temperatures measured by the wireless transponders may be obtained while identifying signals of the wireless transponders, respectively.

According to the embodiment, the following effects may be attained. Since a wireless interrogation signal of a low frequency is sent to the wireless transponder, a response signal may be returned without internally changing a frequency greatly. Therefore, a low-frequency electromagnetic wave may propagate excellently. That is, an electromagnetic wave may be diffracted via a micro small gap, and a wireless signal may be extracted even in environment surrounded by metal. Further, the simple structure enables downsizing and cost reduction. As a result of this, highly accurate wireless sensing in an environment surrounded by metal and also that in a remote location may be readily achieved, which is in contrast to related arts use of which has not been able to easily or accurately attain such sensing.

First Embodiment

Figure 7A:
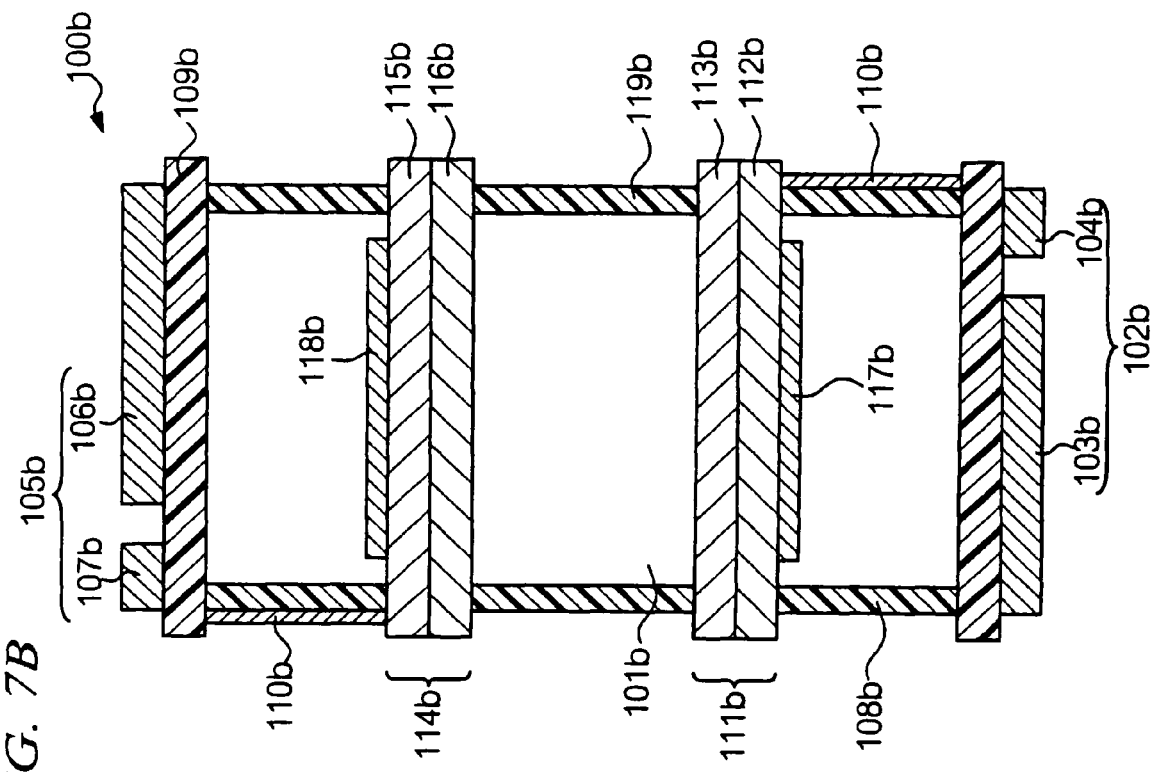
FIGS. 7A and 7B are sectional views showing device structures of wireless transponders 100 according to a first embodiment of the invention.
Figure 7B:
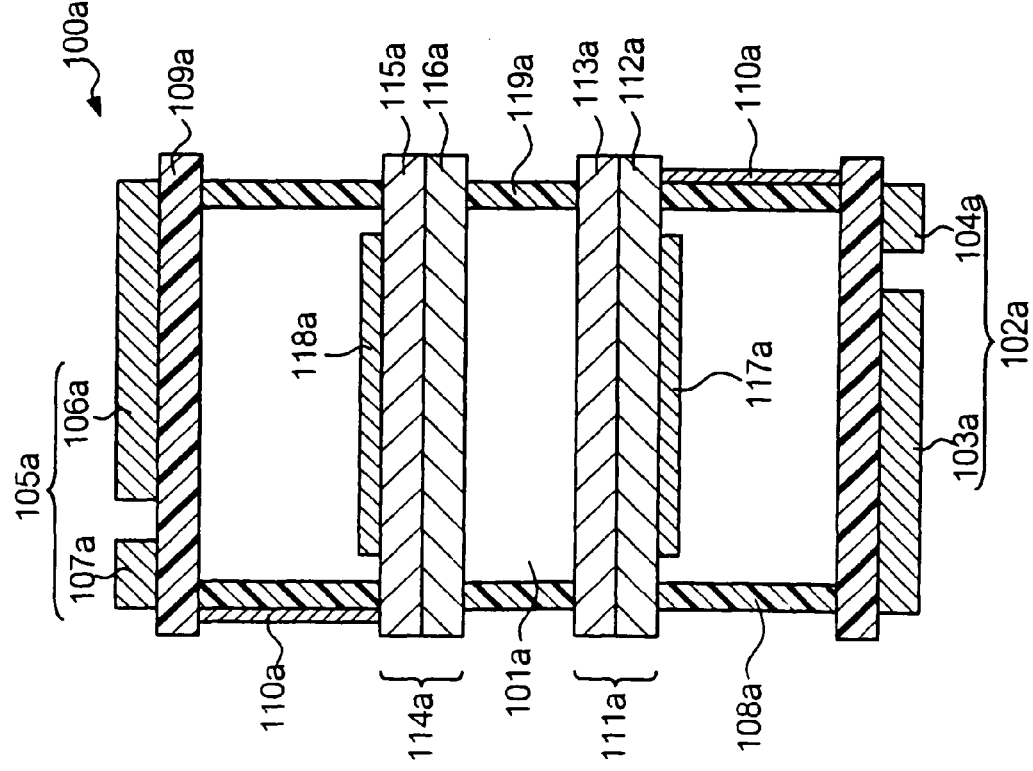

FIG. 7A is a sectional view showing a device structure of a wireless transponder 100a according to the first embodiment. FIG. 7B is a sectional view showing a device structure of another wireless transponder 100b according to this embodiment. The wireless transponders 100a and 100b have the same structure except that delay media (delay media 101a and 101b) have different thicknesses. Suffixes a and b added to reference numerals will be omitted from the following description where related members need not particularly be distinguished from each other by the suffixes.

A receiver unit 102 has a coil antenna 103 and a matching circuit 104. A transmitter unit 105 has a coil antenna 106 and a matching circuit 107. The receiver unit 102 and the transmitter unit 105 are respectively formed on concave carriers 108 and 109.

An input converter 111 has a piezoelectric element 112 for converting an electric signal into an acoustic wave, and a substrate 113 for holding the piezoelectric element 112. An output converter 114 has basically the same structure as the input converter 111. That is, the output converter 114 has a piezoelectric element 115 for converting an acoustic wave to an electric signal, and a substrate 116 for holding the piezoelectric element 115. In this embodiment, the piezoelectric element 112, substrate 113, piezoelectric element 115, and substrate 1116 are all made of PZT. An electrode 117 for generating vibration corresponding to an inputted electric signal is formed on a surface of the piezoelectric element 112. An electrode 118 is formed on a surface of the piezoelectric element 115 as well. In this embodiment, the electrodes 117 and 118 are both made of Al. A spacer 119 is provided between the input converter 111 and the output converter 114. The spacer 119 is desirably formed of an insulating material in order to electrically insulate the input converter 111 and output converter 114 from each other. In this embodiment, the spacer 119 is formed of a plastic material.

A closed space is created between the input converter 111 and the output converter 114 by coupling the input converter 111, output converter 114, and spacer 119 together. This closed space is filled with air as a delay medium. In this embodiment, the spacer 119a is about 5 cm (centimeters) thick and the spacer 119b is about 10 cm (centimeters) thick. These thicknesses are equivalent to approximately 0.3 msec (milliseconds) and 0.7 msec (milliseconds), respectively A wiring 110 is formed on each of the carriers 108 and 109. By coupling the carrier 108 with the input converter 111 as well as the carrier 109 with the output converter 114, the wirings 110 are brought into contact with the electrodes 117 and 118, so that the receiver unit 102 is electrically connected to the input converter 111 as well as the output converter 114 to the transmitter unit 105.

Subsequently, description will be made of a method for manufacturing wireless transponders 100a and 100b. Firstly, pretreatments such as cleaning, etching, and drying are carried out on PZT crystal substrates as materials for forming the piezoelectric element 112, substrate 113, piezoelectric element 115, and substrate 116. By a publicly known method such as photolithography, Al for forming the electrode 117 is formed and patterned on a surface of one of the PZT crystal substrates subjected to the pretreatments, which is to be used as the piezoelectric element 112. In a similar manner, Al for forming the electrode 118 is formed and patterned on one of the PZT crystal substrates which is to be used as the piezoelectric element 115.

The piezoelectric element 112 formed in this manner is bonded to the PZT crystal substrate to form the substrate 113, thereby to form the input converter 111. In a similar manner, the piezoelectric element 112 is bonded to the PZT crystal substrate to form the substrate 116, thereby to form the output converter 114. When bonding PZT crystal substrates to each other, the PZT crystal substrates are bonded so as to have the same polarization directions. Adhesive resin material such as a thermoplastic material, thermosetting material, or ultraviolet curing material is used to bond the substrates. In this case, material having a high elastic coefficient is desirably used from a viewpoint of efficiency.

The input converter 111 and output converter 114 are respectively coupled with the carriers 108 and 109 made of plastics. The spacer 119 is inserted and bonded between the input converter 111 and the output converter 114. In manufacturing the wireless transponder 100, members may be "coupled" by using an adhesive agent such as epoxy resin or by fixing the members in a manner in which the whole wireless transponder 100 is contained in a plastic casing.

A matching circuit 104 and a coil antenna 103 are formed on a surface of the carrier 108 formed as described above. The matching circuit 104 is designed to be capable of receiving a signal of approximately 40 kHz. The coil antenna 103 is formed on ferrite. A wiring 110 which propagates a signal from the coil antenna 103 to the input converter 111 is formed on the carrier 108. On the output side, a coil antenna 106 and a matching circuit 107 are formed on a surface of the carrier 109 in a similar manner to the input side. A wiring 110 is formed to electrically connect the coil antenna 106 to the output converter 114.

Figure 8:
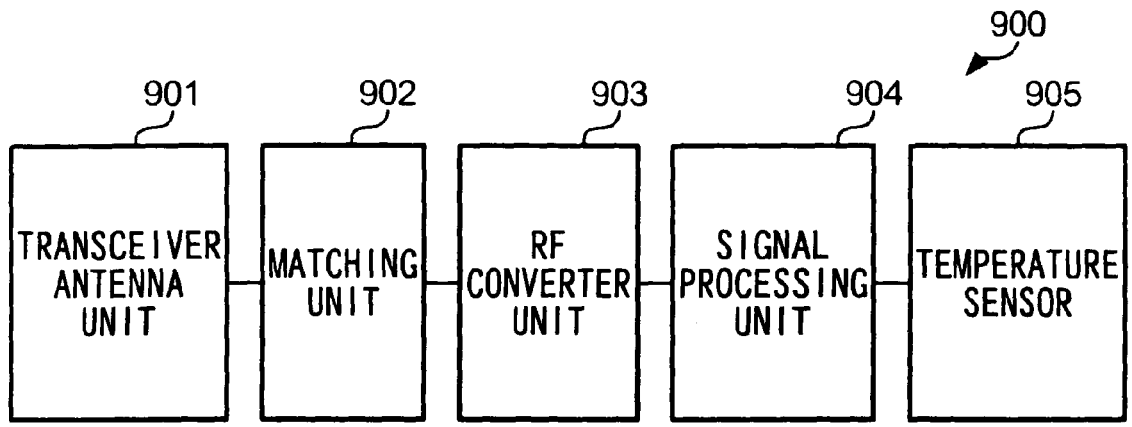
FIG. 8 is a block diagram showing a functional structure of a wireless transponder 900 according to a related art.

FIG. 8 is a block diagram showing a structure of a wireless transponder 900 according to a related art. The wireless transponder 900 has a transceiver antenna unit 901, a matching circuit 902, a RF converter unit 903, and a temperature sensor 904. The wireless transponder 900 has a signal frequency of approximately 2.5 GHz.

Figure 9:
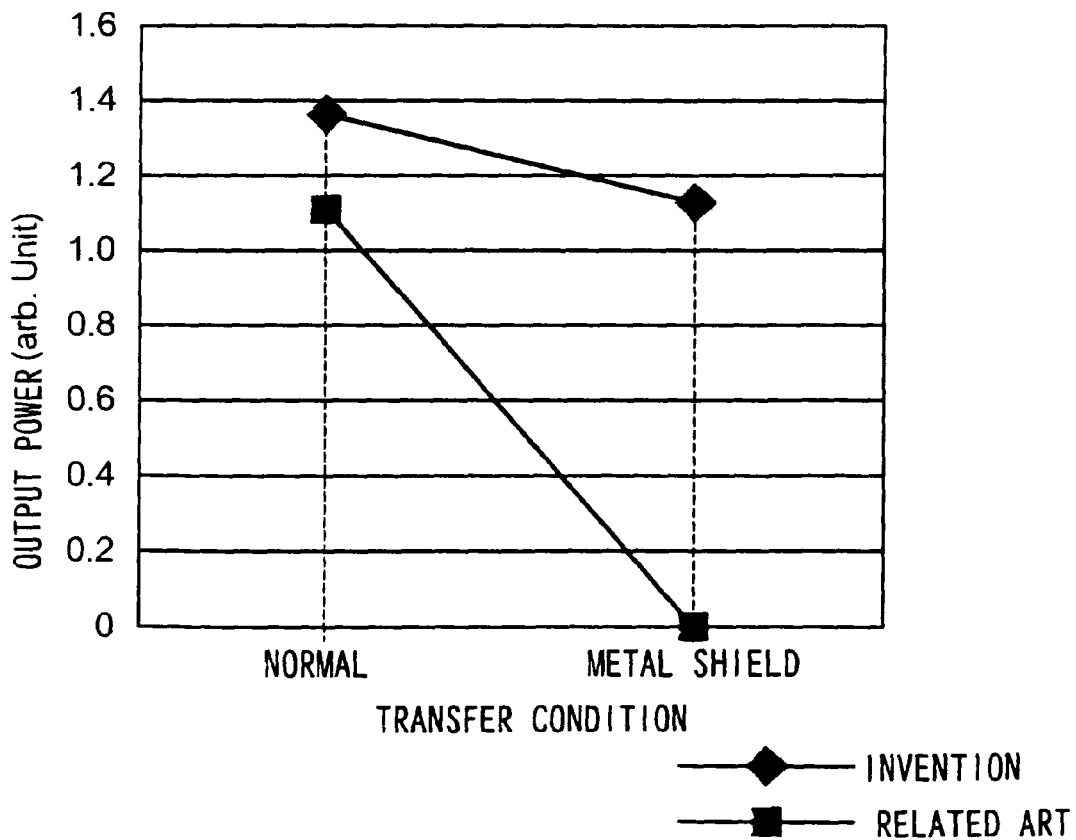
FIG. 9 is a graph comparing performance between the wireless transponder 100 and the wireless transponder 900.

FIG. 9 is a graph comparing the wireless transponder 100 according to this embodiment with the wireless transponder 900 according to the related art. To simulate condition inside an electronic device such as a printer, the wireless transponder 100 and the wireless transponder 900 were placed in a box surrounded by metal, and wireless response signals from the transponders were monitored at a distance of several tens cm (centimeters) from each of the box, within a temperature range of about 0 to 100° C. (degrees centigrade). As shown FIG. 9, response signals which could not be detected by the wireless transponder 900 of the related art could be detected by the wireless transponder 100 of the embodiment. That is, the response signal from the wireless transponder 900 was absorbed in or reflected by metal, with the result that the wireless transponder 900 was not able to function as a wireless transponder in environment surrounded by metal. However, since the wireless transponder 100 used a low-frequency signal of about 40 kHz, the wireless transponder 100 could detect a response signal even at a distance of several tens of cm (centimeters), and functioned as a wireless transponder even in an environment surrounded by metal.

Response signals from the wireless transponders 100a and 100b could be distinguished from each other by a difference between phases of the response signals. That is, a temperature of a (particular) wireless transponder could be measured.

Second Embodiment

Figure 10A:
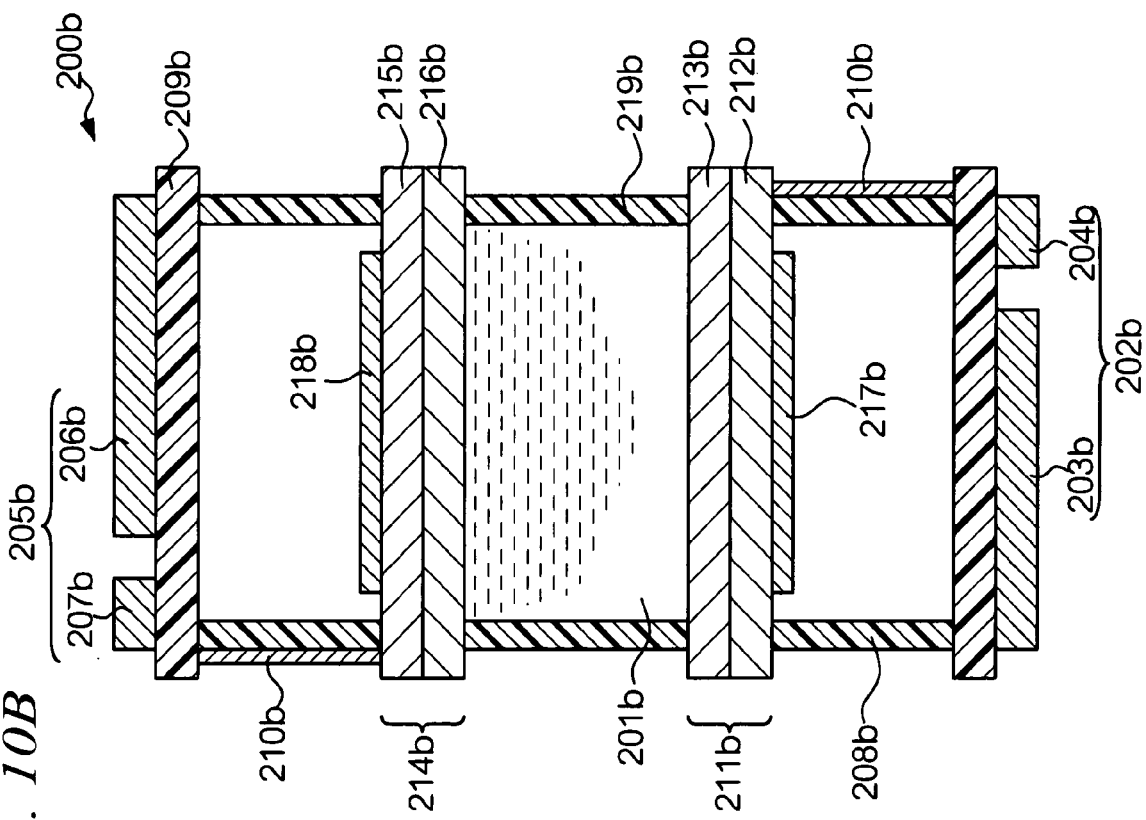
FIGS. 10A and 10B are sectional views showing device structures of wireless transponders 200 according to a second embodiment of the invention.

FIG. 10A is a sectional view showing a device structure of a wireless transponder 200a according to the second embodiment of the invention. FIG. 6B is a sectional view showing a device structure of a wireless transponder 200b also according to the embodiment. The structures of the wireless transponders 200a and 200b are the same with the exception that delay media (delay media 201a and 201b) have different thicknesses. Suffixes a and b for reference numerals will be omitted from the following description where related members need not particularly be distinguished from each other by use of such suffixes.

Figure 10B:
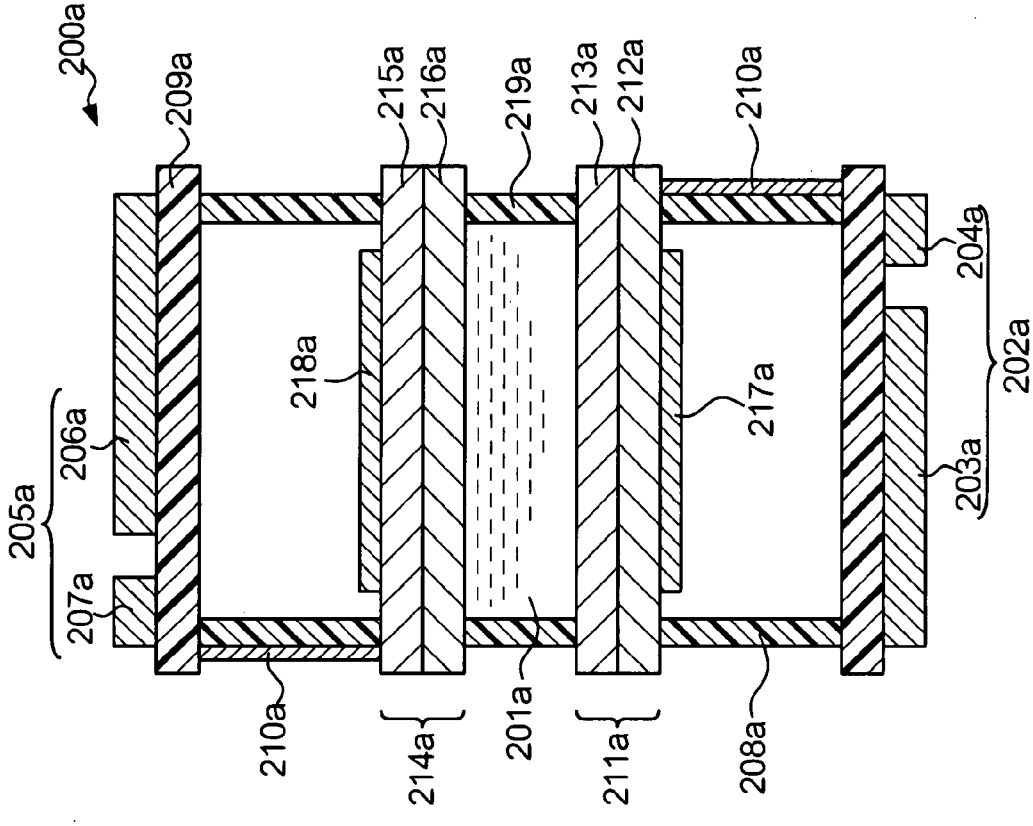

Further, the wireless transponder 200 is manufactured in the same structure and method as the wireless transponder 100 according to the first embodiment except for the differences as follows. A material for the delay medium 201 and a thickness of the material are different. Matching circuits 204 and 207 are matched with a frequency of 130 kHz. Description of features other than differences will therefore be omitted. In the wireless transponder 200, the same components as those of the wireless transponder 100 will be denoted by replacing the hundreds digit of the same reference symbols with a numeral 2. For example, a reference symbol 217 in FIGS. 10A and 10B denotes the same component as denoted at 117 in FIGS. 7A and 7B, which is an electrode.

In this embodiment, water is used as material for the delay medium 201. The delay media 201a and 201b respectively have thicknesses of about 1 cm (centimeters) and about 2 cm (centimeters). These thicknesses are equivalent to delay times of approximately 4 μsec (microseconds) and 8 μsec (microseconds), respectively. The matching circuits 204 and 207 are both designed to be capable of receiving signals of approximately 130 kHz.

A comparative experiment was conducted to compare the wireless transponder 200 having the structure as described above with a wireless transponder according to a related art, in an environment surrounded by metal as in the first embodiment. The wireless transponder 200 could detect a response signal at a distance of several tens cm (centimeters), by use of a low-frequency signal of about 130 kHz. Response signals from the wireless transponders 200a and 200b could be distinguished from each other by a difference between phases of the response signals.

Third Embodiment

Figure 11A:
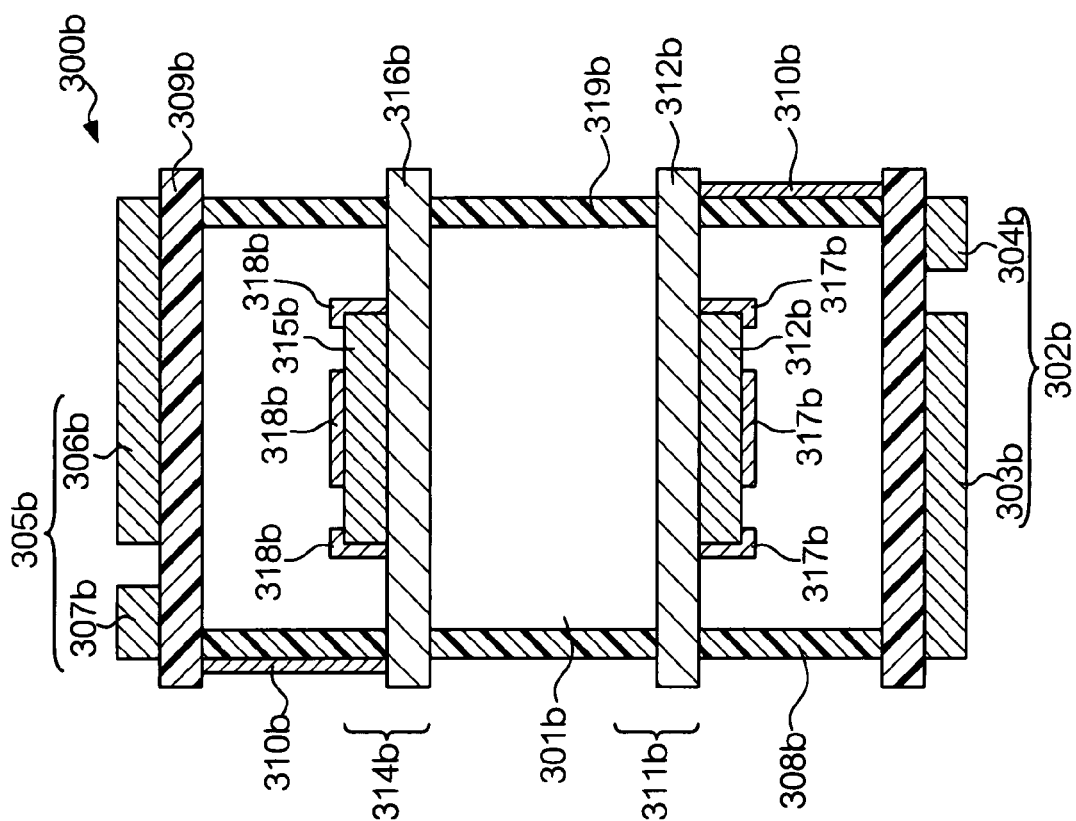
FIGS. 11A and 11B are sectional views showing device structures of wireless transponders 300 according to a third embodiment of the invention.
Figure 11B:
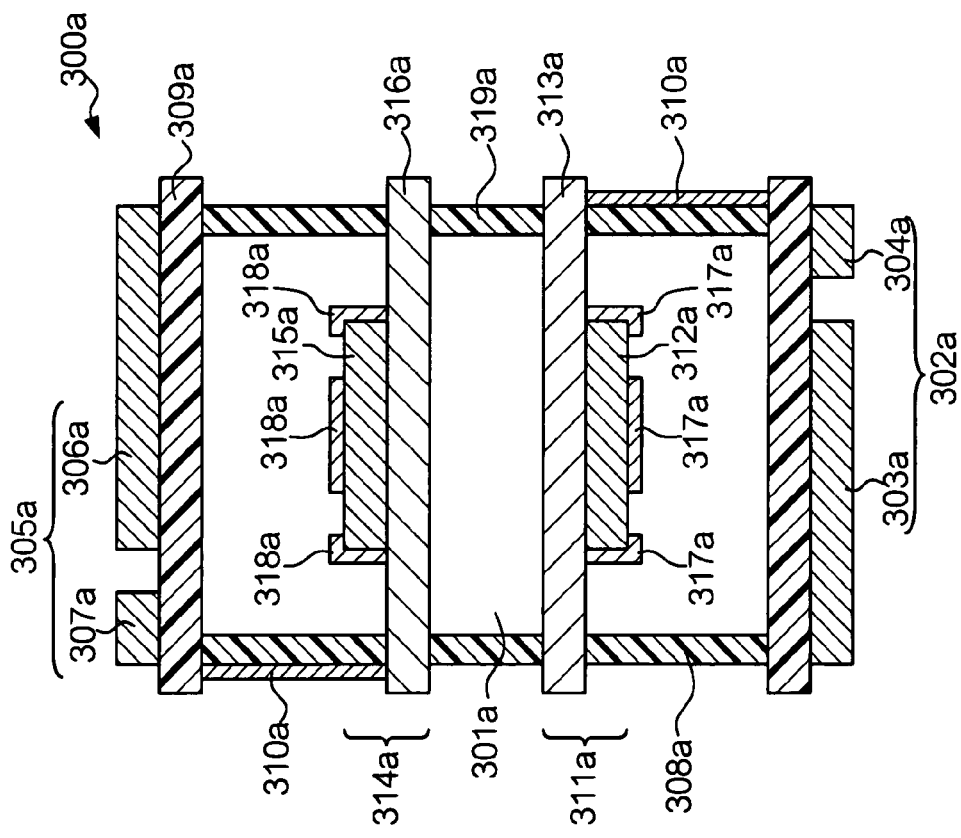

FIG 11A is a sectional view showing a device structure of a wireless transponder 300a according to the third embodiment of the invention. FIG. 11B is a sectional view showing a device structure of the wireless transponder 300b according to the embodiment. The wireless transponders 300a and 300b have the same structure except that delay media (delay media 301a and 301b) have different thicknesses. Suffixes a and b which should be added to reference numerals will be omitted from the following description where related members need not particularly be distinguished from each other by the suffixes.

The following description will be primarily made with regard to such parts that differ from the wireless transponder 100 according to the first embodiment. In the wireless transponder 300, the same components as those in the wireless transponder 100 will be denoted by replacing the hundreds digit of the same reference symbols with 3. For example, a reference symbol 317 in FIGS. 11 denotes the same component as denoted at 117 in FIGS. 7, which is an electrode.

This embodiment differs from the wireless transponder 100 according to the first embodiment in that: (a) PVDF (polyvinylidene fluoride) is used as a material for piezoelectric elements 312 and 315; (b) stainless steel is used as a material for substrates 313 and 316; and (c) a layout of electrodes 317 and 318 differs from that of the wireless transponder 100 according to the first embodiment.

At first, description will be made of a method for manufacturing wireless transponders 300a and 300b. Firstly, pretreatments such as cleaning, etching, and drying are carried out on PVDF crystal substrates as materials for forming piezoelectric elements 312 and 315. Subsequently, by a publicly known method such as photolithography, Al for forming an electrode 317 is formed and patterned on a surface of one of the PZT crystal substrates subjected to the pretreatments. In a similar manner, Al for forming an electrode 318 is formed and patterned on one of the PZT crystal substrates which is used to form the piezoelectric element 315. These PVDF crystal substrates are bonded respectively to the substrates 313 and 316 made of stainless steel, to form an input converter 311 and an output converter 314.

The input converter 111 and output converter 114 are respectively coupled with carrier 308 and 309 made of plastics. In addition, a spacer 319 is inserted between the input converter 311 and the output converter 314. A space created by the input converter 311, output converter 314, and spacer 319 is filled with water as a delay medium 301. After filling the delay medium 301, each of the input converter 311, output converter 314, and spacer 319 are coupled together. In manufacturing the wireless transponder 300, members may be "coupled" by using an adhesive agent such as epoxy resin or by fixing the members in such a manner that the entire wireless transponder 300 is contained in a plastic casing.

In this embodiment, the spacers 319a and 319b respectively have thicknesses of about 1 cm (centimeters) and about 2 cm (centimeters). These thicknesses are equivalent to delay times of approximately 70 μsec (microseconds) and 130 μsec (microseconds), respectively.

A comparative experiment was conducted to compare the wireless transponder 300 having the structure as described above with a wireless transponder according to a related art, in an environment surrounded by metal as in the first embodiment. The wireless transponder 300 could detect a response signal at a distance of several tens cm (centimeters), by use of a low-frequency signal of about 130 kHz. Response signals from the wireless transponders 300a and 300b could be distinguished from each other by a difference between phases of the response signals.

Fourth Embodiment

FIG. 12A is a sectional view showing a device structure of a wireless transponder 400a according to the fourth embodiment of the invention. FIG. 12B is a sectional view showing a device structure of the wireless transponder 400b according to the embodiment. The wireless transponders 400a and 400b have the same structure except that delay media (delay media 401a and 401b) have different thicknesses. Suffixes a and b which should be added to reference numerals will be omitted from the following description where related members need not particularly be distinguished from each other by the suffixes. In the wireless transponder 400, the same components as those in the wireless transponder 100 will be denoted by replacing the hundreds digit of the same reference symbols with 4. For example, a reference symbol 417 in FIGS. 12A and 12B denotes the same component as denoted at 117 in FIGS. 7A and 7B, which in this case is an electrode.

In the wireless transponder 400, a reflector is located at the center of the delay medium, to allow one single member to function both as a receiver unit and as a transmitter unit.

A transceiver unit 402 has a coil antenna 403 and a matching circuit 404. The transceiver unit 402 is formed on a concave carrier 408.

An input/output converter 411 has a piezoelectric element 412 for converting an electric signal into an acoustic wave, and a substrate 413 for holding the piezoelectric element 412. In this embodiment, the piezoelectric element and the substrate 413 are both made of PZT/PVDF-mixed material. A substrate 416 for generating vibration corresponding to an inputted electric signal is formed on a surface of the piezoelectric element 416. In this embodiment, an electrode 417 is formed of Al. The input/output converter 411 is connected to a spacer 419. The spacer is coupled to the reflector 420. In this embodiment, the spacer 419 is formed of a plastic material.

By coupling the input converter 111 and spacer 419, a closed space is created between the input converter 111 and the spacer 419. This closed space is filled with air as a delay medium 401. In this embodiment, spacers 419a and 419b respectively have thicknesses of about 2 cm (centimeters) and about 4 cm (centimeters). These thicknesses are equivalent to delay times of about 140 μsec (microseconds) and about 280 μsec (microseconds), respectively.

A wiring 410 as a transfer path for signals is formed on a carrier 408. By coupling the carrier 408 and the input/output converter 411, the wiring 410 and an electrode 417 are brought into contact with each other, so that the transceiver unit 402 and the input/output converter 411 are electrically connected to each other.

In the wireless transponder 400, an interrogation signal from an interrogator is received by the transceiver unit 402. The received signal is inputted to the input/output converter 411 through the wiring 410 and the substrate 416. The input/output converter 411 converts the electric signal into an acoustic wave. The acoustic wave generated by the input/output converter 411 propagates through the delay medium 401 toward the reflector 420. The acoustic wave is reflected by the reflector 420 and then propagates in an opposite direction (toward the input/output converter 411). The acoustic wave is converted into an electric signal by the input/output converter 411. The electric signal is transmitted as an electromagnetic wave, i.e., a response signal from the transceiver unit 402. The interrogator may detect temperature of a target to be measured, by receiving the response signal and performing signal processing on the received response signal.

Following, description will be made of a method for manufacturing the wireless transponder 400. Firstly, pretreatments such as cleaning, etching, and drying are carried out on substrates made of PZT/PVDF-mixed material, as materials for forming piezoelectric elements 412 and 413. Subsequently, by a publicly known method such as photography, Al for forming an electrode 417 is formed and patterned on a surface of one of the substrates made of PZT/PVDF-mixed material subjected to the pretreatments, which is to be used for the piezoelectric element 412.

The piezoelectric element 412 formed in this manner is bonded to one of the PZT/PVDF-mixed material substrates which is to form the substrate 413, thereby to form the input/output converter 411. When bonding the substrates made of PZT/PVDF-mixed material to each other, the substrates are bonded so as to have the same polarization directions.

The carrier 408 made of plastics is coupled to the input/output converter 411. A spacer 419 is inserted and bonded between the input/output converter 411 and the reflector 420. The reflector 420 may be made of any material such as a plastic or metal material in so far as the material reflects acoustic waves. In manufacturing the wireless transponder 400, members may be "coupled" by using an adhesive agent such as epoxy resin or by fixing the members in such a manner that the entire wireless transponder 400 is contained in a plastic casing.

A matching circuit 404 and a coil antenna 403 are formed on a surface of the carrier 408 formed as described above. The matching circuit 404 is designed to be capable of receiving a signal of approximately 100 kHz. The coil antenna 403 is formed on ferrite. A wiring 410 which propagates a signal from the coil antenna 403 to the input/output converter 411 is formed on the carrier 408.

A comparative experiment was conducted to compare the wireless transponder 400 having the structure as described above with a wireless transponder according to a related art, in an environment surrounded by metal as in the first embodiment. The wireless transponder 400 could detect a response signal at a distance of several tens cm (centimeters), by use of a low-frequency signal of about 100 kHz. Response signals from the wireless transponders 400a and 400b could be distinguished from each other by a difference between phases of the response signals.

Fifth Embodiment

Figure 13A:
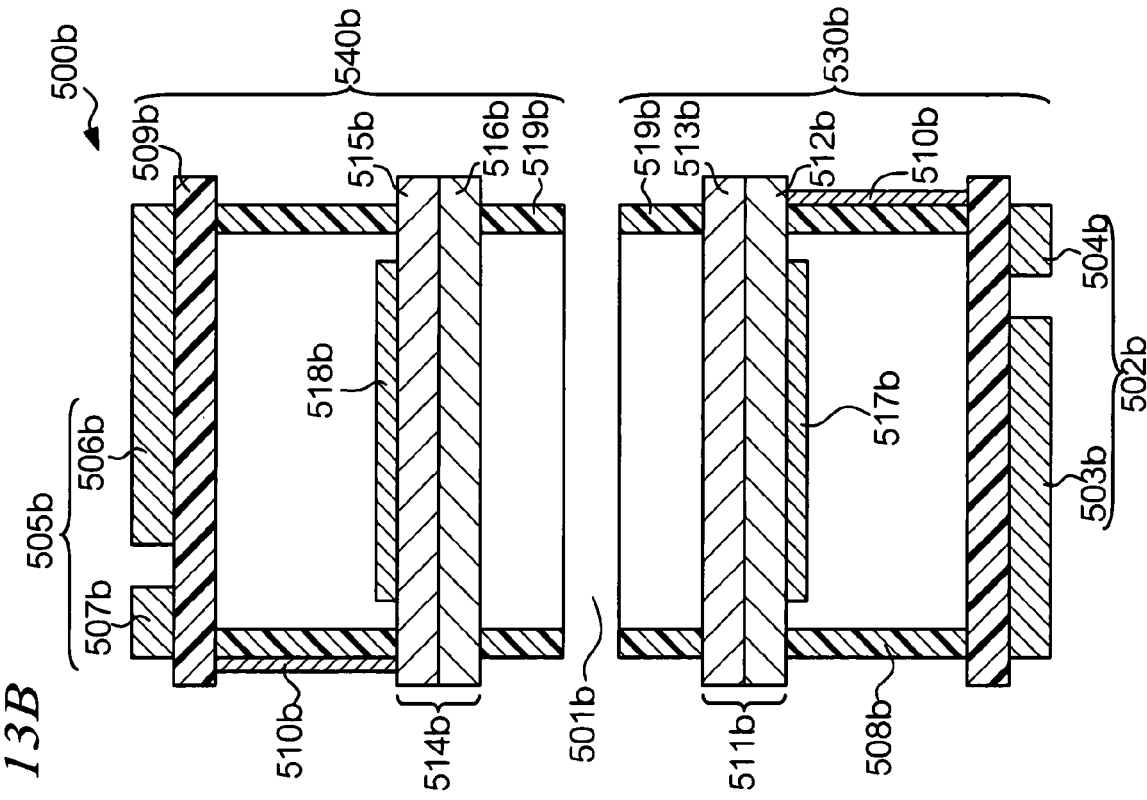
FIGS. 13A and 13B are sectional views showing device structures of wireless transponders 500 according to a fifth embodiment of the invention.
Figure 13B:
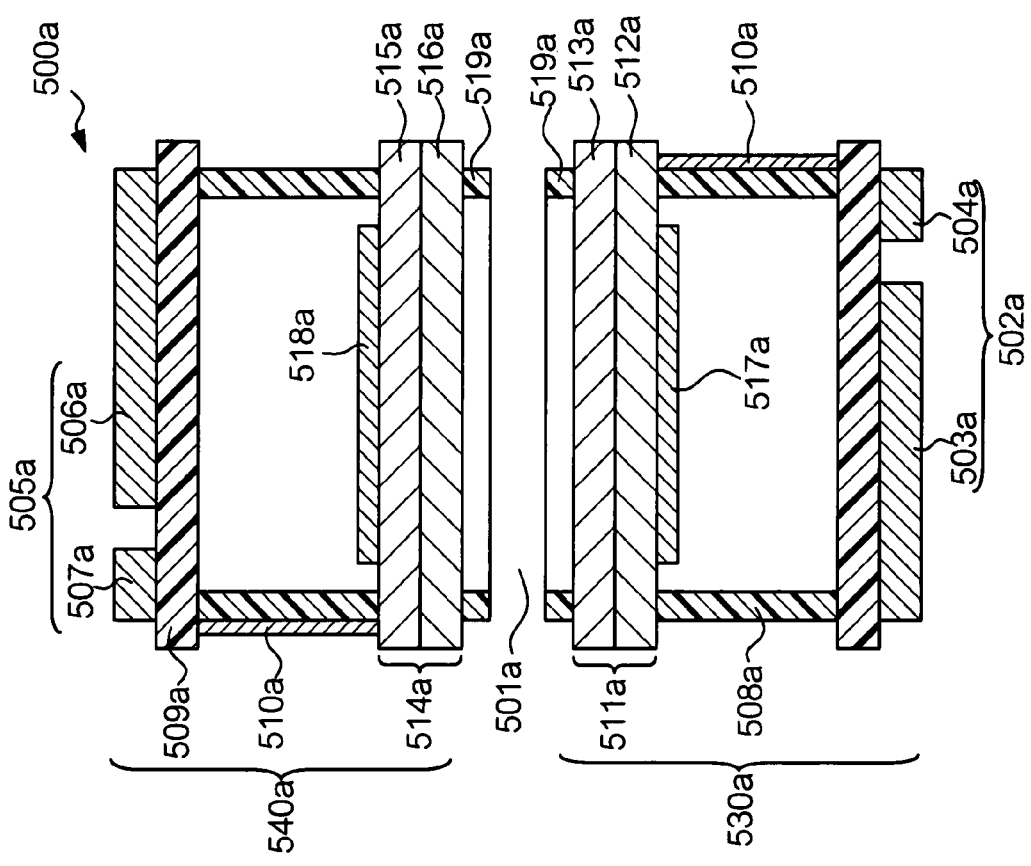

FIGS. 13A and B are sectional views showing device structures of wireless transponders 500 according to the fifth embodiment of the invention. As shown in FIGS. 13A and B, the wireless transponders 500 each have a structure in which the wireless transponder 100 according to the first embodiment is divided into two parts from a middle part of the spacer 119 which serves as a boundary. In the wireless transponder 500, air is used as a delay medium.

Figure 14:
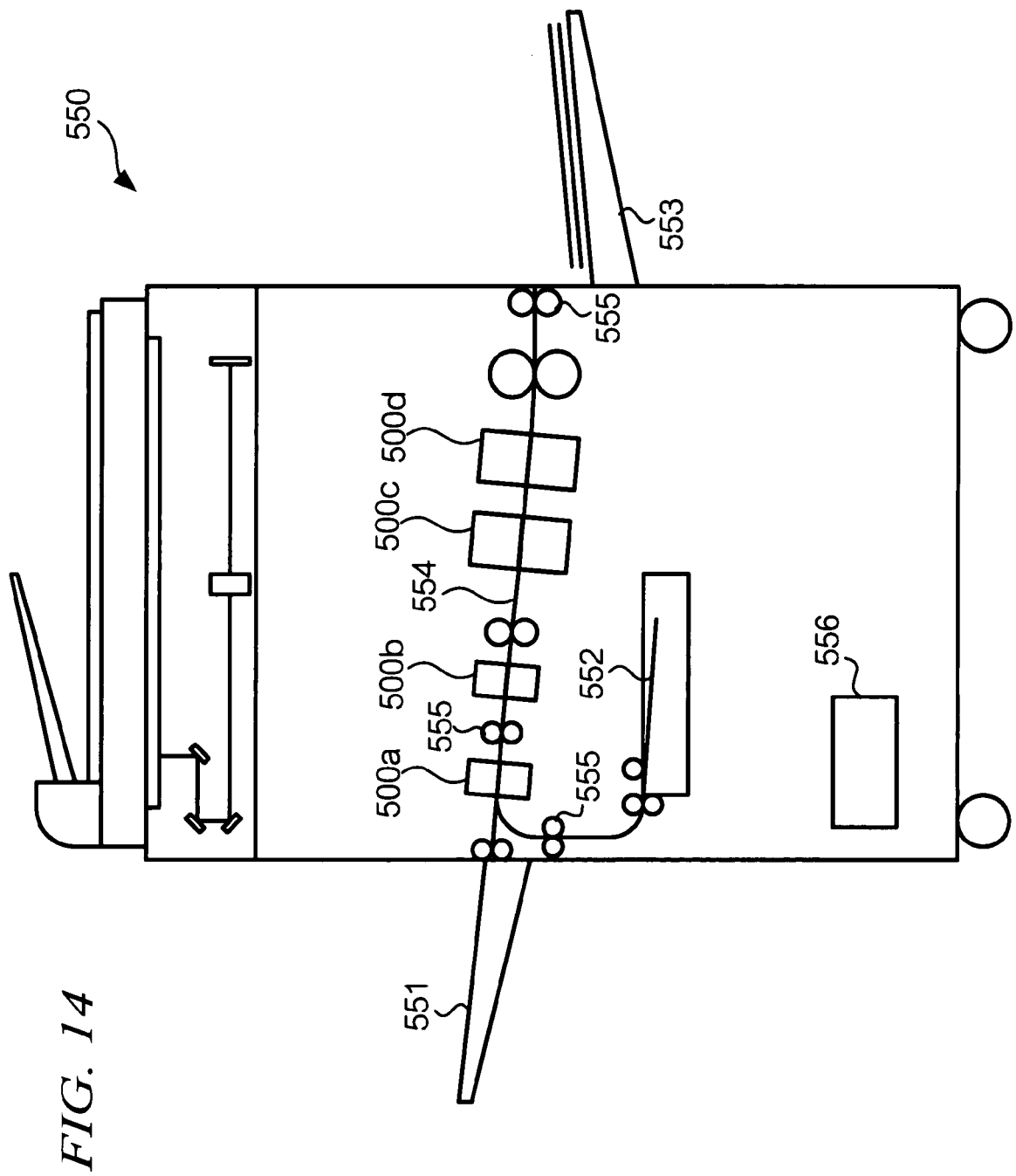
FIG. 14 is a block diagram showing a structure of a multi-function peripheral device 550 using the wireless transponders 500 as sheet detection sensors.

FIG. 14 is a block diagram showing a structure of a multi-function peripheral device 550 as an example of an image forming device using the wireless transponders 500 as sheet detection sensors. The multi-function peripheral device 550 has a sheet conveyor path 554 for conveying a sheet (recording material) to a sheet output tray 553 from a manual feed tray 551 or a cut sheet tray 552. The sheet is conveyed through the sheet conveyor path 554 by conveyor rollers 555. To avoid overly complicating the drawings, image forming units such as developing devices and transfer rollers are omitted from the drawings. In the multi-function peripheral device 550, four sheet detection sensors which are the wireless transponders 500a to 500d are provided on the sheet conveyor path 554.

Each of the wireless transponders 500 is located so as to position the sheet conveyor path 554 between the input unit 530 and the output unit 540. A controller 556 functions as an interrogator in this embodiment and may detect sheets passing, by receiving response signals from the wireless transponders 500. The wireless transponders 500 each function as a sheet detection sensor, based on operation principles as follows. When a foreign material (a sheet) enters into a delay medium (air), a propagation condition of acoustic waves changes. Accordingly, the controller 556 may detect when a sheet has passed beyond a position of a particular one of the wireless transponders 500. The spacer 519 of the wireless transponder 500 has an opening. Therefore, presence or absence of a sheet passing may be detected although the delay medium 501 is not sealed in a closed space.

Further, if the wireless transponders 500a to 500d are arranged so as to allow acoustic propagation paths to have respectively different lengths (the lengths are equivalent to "thicknesses of delay media" in the first to fourth embodiments), the controller 556 may distinguish the wireless transponders 500a to 500d from each other. That is, the controller 556 may detect a position that a sheet has passed beyond.

The wireless transponders 500 are devices to make wireless communications. Therefore, there is no need of connecting the wireless transponders and the controller 556 by wirings, and accordingly, wiring inside the multi-function peripheral device 550 may be simplified effectively. As a result, when the wireless transponders 500 are used as replaceable components such as replaceable sheet detection sensors and when such replaceable components are assembled, it is unnecessary to provide electrical wiring between the control unit 556 and the wireless transponders 500. Installation of the devices may thus be effectively facilitated.

Modifications

The present is not limited to the embodiments described above but may be variously modified in practice.

Combinations of piezoelectric elements, delay media, and device structures are not limited to examples cited in the above embodiments but arbitrary combinations are available. Further, parameters such as thicknesses of delay media described in the above embodiments are not more than examples but may be appropriately designed and changed in compliance with targets to be measured or use conditions. Shapes of piezoelectric elements are not limited to the shapes described in the above embodiments.

Also, the above embodiments have described a case that the interrogator 20 compares phases to obtain physical or chemical characteristics of a target to be measured. However, the method for signal processing to be executed by the signal processing unit 22 in the interrogator is not limited to such a case. The signal processing unit 22 may alternatively perform processing for comparing other parameters than phases, such as signal frequencies or propagation times.

Also, there is described in the above embodiments a case of using wireless transponders as temperature sensors or sheet detection sensors. However targets to be measured are not limited to those described in the above embodiments. For example, the wireless transponders may be used as sensors for measuring physical characteristics such as pressure, humidity, displacement, etc. Such use of wireless transponders may be achieved by selecting an appropriate material and structure for piezoelectric elements or delay media in compliance with physical and chemical characteristics of a target to be measured. For example, in a case of using a wireless transponder according to the invention as a temperature sensor, a desirable delay medium is a gel material through which a state of acoustic propagation sharply changes depending on temperature changes. Alternatively in a case of using a wireless transponder according to the invention as an identification sign, air is desirable as a delay medium.

What is claimed is:

1. A wireless transponder comprising:
   a first substrate having a first surface and a second surface and being made of a piezoelectric element;
   a first electrode formed on the first surface;
   a first member coupled to the first surface;
   a first antenna that receives an electromagnet input signal having a frequency lower than 150 kHz is formed on the first member, and is connected to the first electrode;
   a first spacer coupled to the second surface; and
   a delay medium that is held by the first spacer and the second surface, which is made of a material different from the first substrate and the spacer, and propagates an acoustic wave in a direction approximately perpendicular to the second surface, the acoustic wave being generated by the first substrate in response to the electromagnet input signal received by the first antenna, the acoustic wave excluding a surface acoustic wave.

2. The wireless transponder according to claim 1, further comprising:
   a second substrate having a third surface and a fourth surface, and being made of the piezoelectric element, the third surface contacting the delay medium, the second substrate generating an electromagnet output signal in response to the acoustic wave propagated through the delay medium, the electromagnet output signal having a frequency lower than 150 kHz;
   a second electrode formed on the fourth surface and outputs the electromagnet output signal generated by the second substrate;
   a second member coupled to the fourth surface; and
   a second antenna that is connected to the second electrode is formed on the second member, and transmits the electromagnet input signal.

3. The wireless transponder according to claim 1, wherein the first antenna has a coil that is wound a plurality of turns around a ferrite magnet so as to comply with a matching condition within a frequency range lower than 150 kHz.

4. The wireless transponder according to claim 1, wherein the delay medium includes gas.

5. The wireless transponder according to claim 1, wherein the delay medium includes liquid.

6. The wireless transponder according to claim 1, further comprising
   a reflector that reflects the acoustic wave propagating through the delay medium and is coupled to the spacer, wherein
   the first substrate is configured to generate an electromagnet output signal in response to the acoustic wave reflected by the reflector and propagated through the delay medium, and
   the first antenna is configured to transmit the electromagnet input signal.

7. The wireless transponder according to claim 1, wherein the spacer has an opening.

8. The wireless transponder according to claim 1, further comprising
   a matching circuit formed on a first surface of the first member, and
   wherein the first antenna that receives the electromagnet input signal is formed on the first surface of the first member.

9. An electronic apparatus comprising
   a housing made of metal; and
   a first wireless transponder installed in the housing,
   the first wireless transponder including:
   a first substrate having a first surface and a second surface and being made of a piezoelectric element;
   a first electrode formed on the first surface;
   a first member coupled to the first surface;
   a first antenna that receives an electromagnet input signal having a frequency lower than 150 kHz is formed on the first member, and is connected to the first electrode;
   a first spacer coupled to the second surface; and
   a delay medium that is held by the first spacer and the second surface, which is made of a material different from the first substrate and the first spacer, and propagates an acoustic wave in a direction approximately perpendicular to the second surface, the acoustic wave being generated by the first substrate in response to the electromagnet input signal received by the first antenna, the acoustic wave excluding a surface acoustic wave.

10. The electronic apparatus according to claim 9, further comprising a second wireless transponder including:
    a second substrate having a third surface and a fourth surface and being made of the piezoelectric element;
    a second electrode formed on the third surface;
    a second member coupled to the third surface;

a second antenna that receives an electromagnetic input signal having a frequency lower than 150 kHz, which is formed on the second member, and is connected to the second electrode;

a second spacer coupled to the fourth surface; and a delay medium that is held by the second spacer and the fourth surface, which is made of a material different from the second substrate and the second spacer, and propagates an acoustic wave in a direction approximately perpendicular to the fourth surface, the acoustic wave being generated by the second substrate in response to the electromagnet input signal received by the second antenna, a length in the direction being different from that of the first wireless transponder.

11. The electronic apparatus according to claim 9, wherein the first spacer has an opening, and the electronic apparatus further includes:

a recording material conveyor path that extends through the opening; and a detector that detects whether a recording material has passed beyond a position corresponding to an inside of the opening on the recording material conveyor path, based on a response signal from the first wireless transponder.

12. The electronic apparatus according to claim 9, further comprising a matching circuit formed on a first surface of the first member, and wherein the first antenna that receives the electromagnet input signal is formed on the first surface of the first member.

* * * * *